United States Patent [19]

Imhof

[11] 4,028,030
[45] June 7, 1977

[54] INSTALLATION FOR PELLETIZING ORGANIC WASTE MATERIALS

[75] Inventor: Hugo Imhof, Geneva, Switzerland

[73] Assignee: S.A.F. Societe Agricole et Fonciere S.A., Luxembourg

[22] Filed: Aug. 5, 1976

[21] Appl. No.: 711,889

Related U.S. Application Data

[62] Division of Ser. No. 577,167, May 14, 1975.

[30] Foreign Application Priority Data

July 3, 1974 Switzerland ............... 9140/74
Nov. 13, 1974 Switzerland ............. 15121/74

[52] U.S. Cl. ................. 425/135; 425/331; 425/DIG. 230; 425/325
[51] Int. Cl.² .................................... B29C 3/02
[58] Field of Search ............ 425/80, 81, 82, 83, 425/86, 222, 324, 325, 190, 192, 135, 200, 331, 317, DIG. 230

[56] References Cited

UNITED STATES PATENTS

| | | | |
|---|---|---|---|
| 3,354,845 | 11/1967 | Schultz | 425/190 |
| 3,406,426 | 10/1968 | Pobst et al. | 425/135 |
| 3,758,563 | 9/1973 | Nematsu et al. | 425/331 X |
| 3,801,243 | 4/1974 | Smith et al. | 425/135 X |
| 3,807,926 | 4/1974 | Morse | 425/DIG. 230 |
| 3,841,817 | 10/1974 | Moldenbauer et al. | 425/DIG. 230 |
| 3,847,516 | 11/1974 | Hoffman | 425/135 X |
| 3,918,868 | 11/1975 | Villaume | 425/135 X |
| 3,932,736 | 1/1976 | Zarow et al. | 425/DIG. 230 |

*Primary Examiner*—J. Howard Flint, Jr.
*Attorney, Agent, or Firm*—Robert E. Burns; Emmanuel J. Lobato; Bruce L. Adams

[57] ABSTRACT

Organic waste materials are mixed and batches are separately brought into the form of a coherent substantially homogeneous pulp with a moisture content between 50 and 55% by weight, by heating with exhaust gases, drying in an oven, admixing dry material, and spraying dry material with liquid manure recuperated from the waste materials. The pulp is chopped and immediately thereafter extruded to form frangible strands, sections of which are allowed to break off, without cutting, and to further break by dropping onto a conveyor. Breakage into pellets is completed, without the use of a conventional pelletizing drum involving compression of the pellets, in a vibrated fluidized bed where the pellets are superficially dried to a non-tacky state, drying being completed in further non-vibrated fluidized beds.

10 Claims, 4 Drawing Figures

INSTALLATION FOR PELLETIZING ORGANIC WASTE MATERIALS

This is a divisional of application Ser. No 577,167, filed May 14, 1975.

The invention relates to the pelletization or granulation of organic materials.

The role of humus in the fertility of soil is capital and it is important to maintain a sufficient quantity thereof in arable earth. For various reasons and due to economic factors leading to specialization, the availability of organic manure in the proximity of certain types of farms is decreasing and is liable to continue doing so. Even when there is an important source of animal dejections, such as cattle or horse manure, in the proximity of market gardens or viticultural areas, it is still necessary to solve the problems associated with the costs of transporting a very humid material as well as problems of handling and storage, labor, odors, unsightliness and other prejudices to the environment. The usable organic wastes may be of vegetable origin, such as vegetable detritus, residues from distillation, citrus fruit peel and so on, or of animal origin such as cattle, horse, sheep, poultry or other dejections mixed with vegetables such as straw or hay. These organic materials are heterogeneous and, according to their length of storage, may have a high water content which may reach 85 to 90% by weight. All contents quoted hereinafter in percentages will be given by weight. The collection and storage of these materials may involve the incorporation of foreign bodies such as wood, stones and metal objects. The use of these materials as an organic additive to the soil can only be envisaged in the zones where they are produced, and this use involves non-negligeable hindrances due to odors and filth.

It has already been proposed to submit such organic wastes available different regions to physical, mechanical and thermic treatments to transform them from their initial untreated, humid, polluted and often smelly and dirty state into a utilisable dried, purified, odor-free, easy-to-handle, storable, economically transportable and easy-to-use state.

According to a technique used in France, the organic matter is dried by heating as a mass to evaporate off water. After evaporation, the originally humid matter with a moisture content of from 65 to 85% has a moisture content of between 8 and 15%. To carry out this drying, it is necessary to strongly heat compact blocks of the material. After this operation, the material is ground to a powder which is then compressed and extruded by mechanical means and cut to form cylindrical pellets having a diameter of about 5 to 10 mm and a length of about 10 to 30 mm. The mechanical compression required to obtain this product is very high but not always sufficient to reagglomerate the dried powder. It often becomes necessary to rehumidify the material obtained with steam or by spraying with liquid manure. The pelletized product is very compact, only very slightly porous and has a smooth impermeable surface so that assimilation by the soil takes a long time since the product is practically impervious. Although despite these hindrances the product obtained is nevertheless a useful good-quality organic additive, the drawbacks involved in its manufacture and use cannot be neglected. These drawbacks are: a considerable production of dust; productin of odors during the dehydration at high temperatures favorizing the formation of mercaptans; heterogeneous heating of the mass of material; the production of compact pellets having a water-impervious surface leading to slow assimilation in the soil; and the high wear of the draw or extruder plates due to the high pressures communicated by the dry and abrasive material.

A Dutch concern (Kopomix - Komeco) use in the same technique for the production solely of the dried powder. Whereas, in contrast to pellets, the powder is very easily and rapidly assimilated by the soil, the use thereof nevertheless involves several drawbacks, notably a large production of dust liable to be carried by the wind, and the consequent respiratory dangers for the farm laborers.

A process described in French Pat. No. 2,192,081 and derived from techniques used for the manufacture of chemical fertiliziers, proposed crushing of damp manure by means of a fluted cylindrical crusher to obtain a homogeneous pulp having a water content between 60 to 70%, and forming cylindrical rods by passing the humid pulp through a draw or extruder plate provided with a cutting device, then agitating these rods in a pelletizing drum to provide substantially spherical pellets which are then dried in conventional fluidized bed drying apparatus.

In a process described in British Patent Specification No. 835,216, organic sewage sludge is reduced to a water content of 45 to 55% by mixing the humid raw material with relatively dry material, then the mixture is pelletized by agitating in a pelletizing drum and finally drying the formed pellets in a fluidized bed.

This process has the advantage that it can be operated in two dissociable phases, namely a phase of transforming the raw material into a working material having a moisture content within a given range, and a phase of pelletizing the working material, but the use of a pelletizing drum produces a compression of the pellets which renders the homogeneous drying thereof difficult and the final texture of the pellets is relatively impervious which makes assimilation by the soil difficult.

The invention aims to palliate these various drawbacks.

An apparatus according to the invention carries out process of transforming organic waste material into pellets comprises bringing the organic waste material to a water content between 45 and 60%, preferably between 50 and 55%, homogenizing the material, chopping the homogenized material and extruding it to form strands, and submitting the strands to physical constraints and drying to break the rods into pellets without cutting, compression or the use of a pelletizing drum.

In the second phase of the process there is thus no cutting or use of a pelletizing drum, but the pellets are formed by breaking the rods leaving the extruder firstly under the effect of their own weight and then as a result of falling and, if necessary, by vibrations and collisions. Under the effect of gravity, rupture lines are already formed in the rods at the outlet of the extruder The pellets are thus formed freely without compression and at the selected water content of the working material. As the pellets are only slightly compressed, natural or forced drying thereof to a water content of 10 to 14% takes place regularly on small volumes of material and in good conditions whereby the pellets have a water absorbent final texture which facilitates assimilation by the soil.

The invention also concerns an installation for carrying out this process, comprising means for storing and mixing organic waste materials, at least one expansion chamber for recuperating the heat of the residual gases to pre-dry the humid organic waste materials and recuperating the dry powders carried by these gases, at least one predrying oven, crushing and pulverizing means, adjustable supply means supplying chopping means, extruding means, at least one perforated vibrating evaporation bed, a source supplying hot gas to the evaporation bed through said perforations, and at least one silo.

These and further features of the invention will now be described in detail, and by way of example, with reference to the accompanying schematic drawings, in which.

Figure 1:
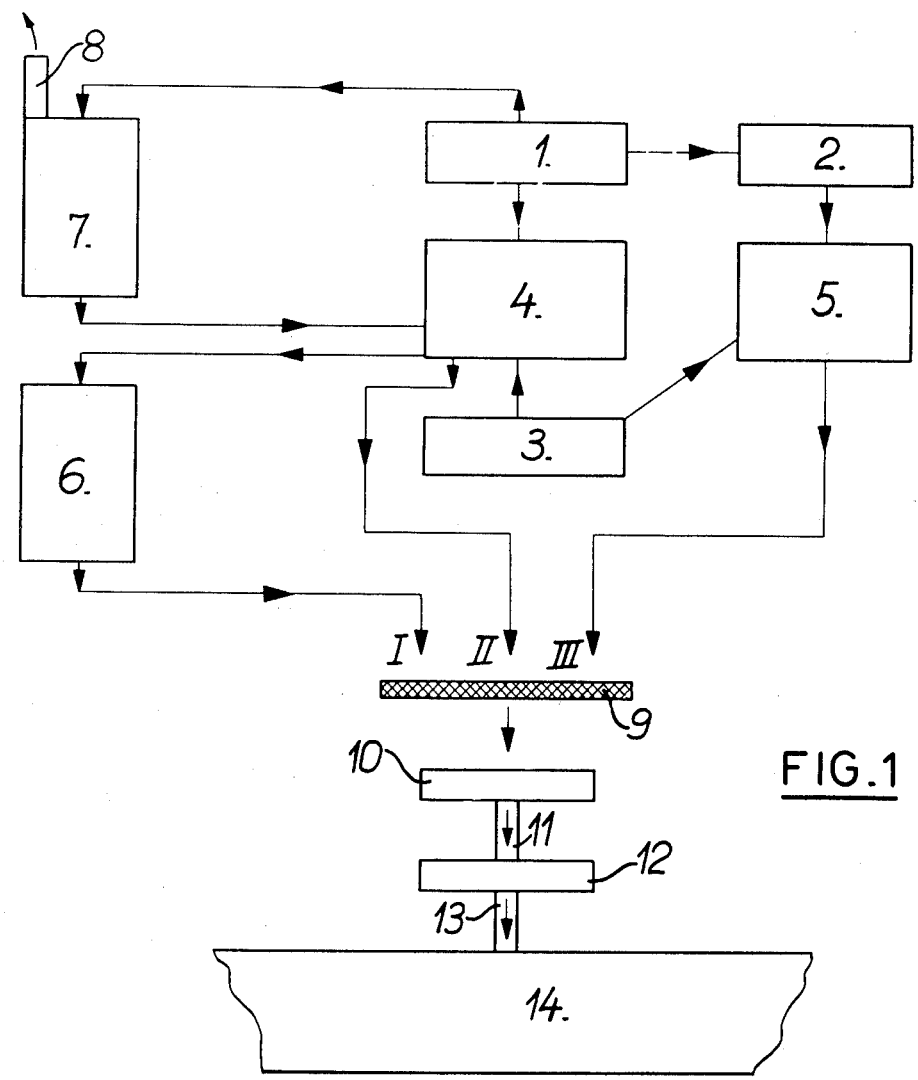
FIG. 1 is a diagram of the installation for preparing a mixture of organic waste materials with a moisture content between 50 and 55%.
Figure 2:
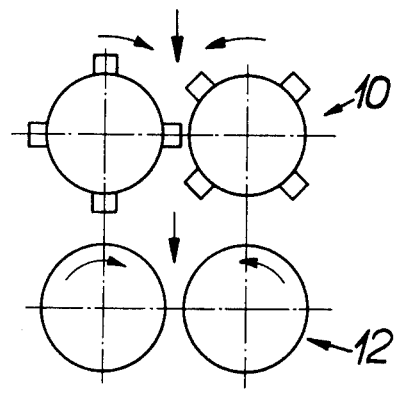
FIG. 2 is an elevational view of breaking and rolling devices forming part of the installation of FIG. 1.
Figure 3:
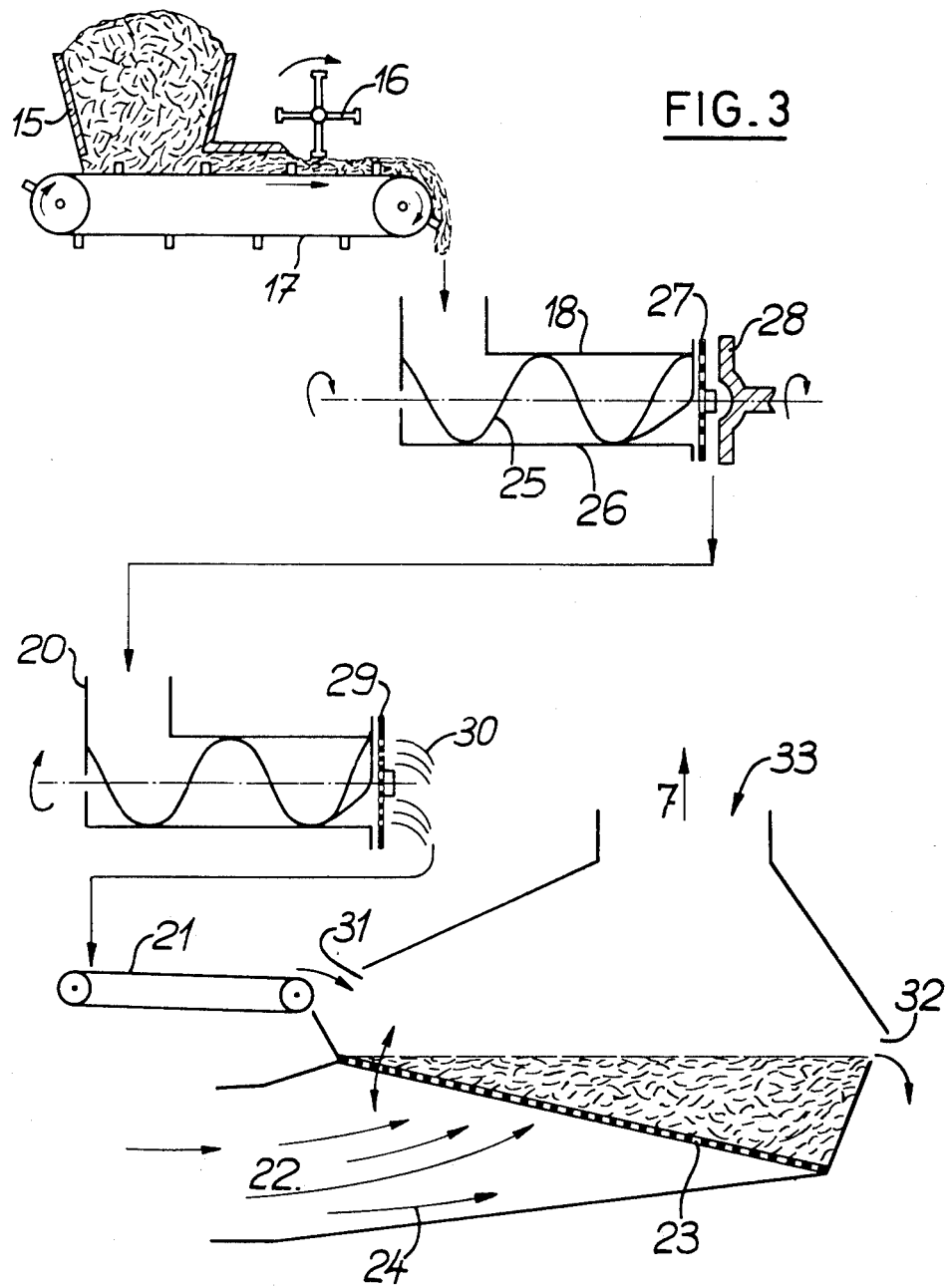
FIG. 3 shows the principal elements of the installation for obtaining the final product.

The installation shown in FIG. 1 comprises a storage area 1 for storing manure and humid organic materials, a tank 2 for collecting liquid manure and waste water from the material in storage area 1, an area 3 for storing dry organic materials, a mixing area 4 for mixing the wet and dry organic materials, a mixing area 5 for mixing dry organic materials with liquid manure by spraying to produce fermentation, a pre-drying oven 6, an expansion chamber 7 for expansion of all the exhaust gases from the production unit (both those produced by the pre-drying oven 6 and those produced by the evaporation units of the installation schematically shown in FIG. 3), an extractor 8 for expulsion into the atmosphere of water vapor and cooled gases, a metal body detector 9, a clod-crushing breaking means 10, rolling means 12 to reduce the hard bodies to a thickness less than 3 mm, a removal conveyor belt 11 between the breaking means 10 and the rolling means 12, a conveyor belt 13 removing the materials after rolling, and a storage area 14 for the working material thus obtained and having a water content of from 50 to 55%.

In the mixing area 4 a caterpillar-track mechanical shovel or bucket is preferably used to efficiently provide an overall dosing of the material, provide a good mixing and break vegetable fibres. A first sorting and removal of visible foreign bodies may be carried out in area 4. The predrying in oven 6 takes place by hot gases at a temperature of about 120° to 150° C to bring the mixture from area 4 from a water content of 70% to a water content less than 60% and close to 50%. Certain quantities of humid organic materials are placed in the expansion chamber 7; they absorb heat from the hot gases and the dry dust carried by these exhaust gases and which decant into the expansion chamber. These humid organic materials may be left still in the expansion chamber 7, or may pass continuously on a conveyor belt.

The origin of the raw materials may be, for area 1, manure and organic materials with a water content between 60 and 85%; for storage area 3, dried manures recuperated in certain poultry farms as well as extruded products from the final installation formed by non-standard sized pellets and dust recuperated after evaporation prior to storage of the finished pellets during the bagging operation. These latter materials have a water content between 10 and 30%. To these raw materials are added liquid manure and the waste water from the products stored in area 1 and collected in tank 2.

Different possible circuits between posts 1 to 7 are indicated by the arrows. Several circuits of the initial humid material are provided to reduce the water content to below 60%, namely in the range 50 to 55%, to satisfy the requirements for the formation of pellets by a continuous extrusion without cutting. A certain quantity of the humid organic material is placed in the expansion chamber 7 to undergo partial evaporation by absorption of the heat of the exhaust gases and the incorporation of the dry powders carried by these gases. The heterogeneous material leaving the expansion chamber 7 is delivered to the mixing area 4. After a first homogenization by the track vehicle, it will receive humid material from the area 1 if it is too dry or dry organic materials from the area 3 if it is too wet. The starting material obtained will then be delivered to the metal detector 9 as indicated by arrow II.

Certain quantities of the humid organic materials of area 1, amongst the dryer initial materials, are mixed with the dry organic materials of area 3 and give mixtures with a moisture content in the desired range of 45 to 60%. The starting material obtained is delivered as before towards detector 9.

Certain quantities of the humid organic materials of area 1, homogenized in area 4, and possibly mixed with dry organic materials from area 3, reach a water content of 70% and are delivered to the inlet of the predrying oven 6 where their water content is reduced to 50 to 55% and are then delivered to detector 9, as indicated by arrow I.

The liquid manure recuperated in tank 2 serves for the formation of artificial manure on the area 5 by spraying and fermenting the dry organic materials from area 3, until the moisture content is within the desired range. The starting material obtained is delivered to detector 9 as indicated by arrow III.

Visible foreign bodies such as stones, metal, wood, rags, and pieces of plastic can be removed at the mixing areas 4 and 5 and metals which have passed by this visual control are detected and removed by detector 9. The starting material then undergoes breaking and mixing in a clod-crusher 10, then is rolled between two cylinders 12 and stored at area 14. The clod-crusher 10 is of a known type comprising two oppositely turning cylinders with helicoidal ribs.

To enable, in the following phase, the formation of pellets without a cutting system, the mixture must have a water content of between 45 and 60%. With a water content above 60% the extruded strands of material can stick together and reagglomerate. When the water content is less than 60%, the rods of material are frangible and break into elements or pellets whose length is one or two times the linear dimension of their thickness. For cylindrical rods, the length will thus be equal to once or twice the diameter. Breakage into pellets takes place upon falling of the strand sections onto the conveyor belt, and by vibration of the evaporating means etc. With a water content less than 45%, there is a risk that the strands of material will not be properly formed, especially if the pressure applied to the material is not very great. Also, the coefficient of friction of the material passing through the orifices of the extrusion plate increases, and abrasion becomes considerable.

The predrying oven 6 may for example operate with heavy fuel No. 2 and produce combustion gases mixed with air, at a temperature of about 120° to 150° C. For example, a predrying oven with a capacity of 9 tons per hour of material with an initial water content of 70% can produce 6 tons per hour of starting material with a water content of 55%. This involves an evaporating capacity of 3 tons of water per hour.

The gas expansion chamber 7 may be equipped with a low speed conveyor belt for the passage of humid organic materials in the chamber to recuperate the dry dust and the residual heat of the exhaust gases. For example, in the case of a final production of 4 metric tons per hour of pellets with a water content of 10 to 14%, it is possible to recuperate 100 to 150kg of dust per hour and a part of the heat of 300,000 m$^3$ per hour of gas at a temperature of 60° C. It is thus possible to obtain 20 tons per day of material having a final water content of 55% from material with an initial water content of 75% to 80%.

The dimensions of the machines of the installation will depend upon the desired overall hourly production rate. For example for a production plant designed to produce 4 tons per hour of pellets with 12% of residual water, the production of starting materials with a water content of 50 to 55% may be as follows:
  predrying oven: 6 tons per hour
  expansion chamber: 1 ton per hour
  mixture of humid and dry organic materials: 1 ton per hour
  mixture of dry and liquid organic material: 0.5 ton per hour.

To sum up, the first phase of the process, as described, has the following advantages: the phase of preparation of the starting material is independent of the manufacturing (pelletizing) phase, which confers the system with a great flexibility. This phase provides a starting material free from hard foreign bodies, with partly shredded vegetable fibres and a water content of the order of 50 to 55%. This water content will permit manufacture of the final pellets by continuous extrusion without a cutting system or a pelletizing drum. Mixing is used to reduce the moisture, whereby the supply of additional heat is avoided. The residual heat and dust carried by the exhaust gases are recuperated. In this way, an economy is made while resolving a problem of atmospheric pollution. The heat required for the final production is spread out. Although, the same total overall heat required for a given production may still be used, a part is used in this preparatory phase and this resolves the problem of pelletization and enables elimination of the corresponding machine. Finally, only by using a controlled starting material is it possible to control the efficiency, operation outputs, behaviour and adjustments of the various machines of the final production.

At the end of this first phase, the starting material obtained is in the form of a non-compacted bulk with a pasty appearance, comprising organic materials with a granularity less than 0.5 mm, laminated hard solid bodies whose granularity corresponds to the separation of the laminating cylinders 12 (e.g. 3 to 4 mm), flexible or fibrous elements partly cut by the tracks of the vehicle and by the clod-crusher and which are thus in the form of thin elements with a length which may reach several centimeters. The mean water contents of this mixture is between 50 to 55%.

In the installation shown in FIG. 3, which in general will be a production plant, the starting material is firstly homogenizied by chopping, then extruded into continuous strands which are allowed to break and form into pellets before and during evaporation of the pellets and the broken strands by means of hot gases on a vibrating or fluidized bed, or both together. The pellets are then passed through sieves to eliminate oversize pellets and dust which are recycled, and the remaining pellets are bagged.

The installation schematically shown in FIG. 3 comprises a loading hopper 15 delivering the starting material onto a conveyor belt 17 cooperating with a delivery regulator 16 of a known type having rotating blades whose operative ends move in the direction opposite the belt 17. The flow of material can be adjusted by setting the speed of the conveyor or the spacing between the regulator and the conveyor. The installation also includes at least one chopper 18 (generally two: one for coarse chopping, the other for fine chopping), an extruder 20, and a further conveyor belt 21 between the output of extruder 20 and an evaporating bed 22 including an inclined vibrating plate 23 which is perforated to allow the passage of hot gases 24 from a source, not shown. The installation further includes a lift conveyor for delivering the pellets leaving bed 22 to a rest silo, sorting and dust-removing sieves, an evaporating bed to possibly terminate evaporation, a cool-air operated pellet-cooling station, a storage silo, an installation for recovering dust produced during handling and storage of the pellets, and a bagging installation including dust-removing means: all of these elements are of a known type, and not shown in FIG. 3. The material passes from one station to the next as indicated by the arrows in FIG. 3.

When the starting material is always very fibrous, as is the case of manures with a high straw content, it may be useful to use two choppers, a first for coarse chopping and a second for fine chopping. The first chopper could cut the fibres to a length of several centimeters, and the second chopper cut the residual fibres to a length of several millimeters. However, in general, it is sufficient to use a single chopper formed of an Archimedes screw 25 rotating inside a cylinder 26 whose axis is horizontal. The product driven through cylinder 26 by the screw 25 passes through a perforated grid or plate 27. An end of the screw 25 is in contact with the plate 27, the angle formed by the screw thread on the plate decreasing to zero degrees to provide a spatual effect. Knives, not shown, rotated with the screw 25 and in contact with the screw-contacting face of plate 27 cut the fibres which accumulate at the inlet orifices of the perforations of plate 27. This prevents cramming against the perforated plate as in the case of choppers operating simply with an axial compression of the material against a perforated plate. A rotary external cutter 28 driven coaxial to and at a different speed to screw 25 cuts the material leaving the perforations of plate 27. For example, for an output of about 9 metric tons of material with a water content of 50 to 55%, the cutter could have an Archimedes screw of diameter 600mm and a pitch of 250 to 300 mm driven at a speed of 20 r.p.m. and having two internal knives fixed to the screw and scraping the perforated plate. Plate 27 may have a thickness of 20 mm and be pierced with holes with a diameter of 30 mm and equispaced from one another by 40 mm. The screw axle is preferably held by a ball bearing against the plate 27. The blades of external cutter 28, bearing and scraping against the plate 27, will preferably be rotated at 100 to 200 r.p.m. What is important is for the material to never be compressed although it is mechanically supported continuously until it passes through the perforations of plate 27.

The extruder 20 is similar to the copper except that it has a plate 29 with smaller perforations, and there is no device for cutting the extruded strands. To avoid segregation of small fibrous particles at the inlet of the perforations of plate 29, which could rapidly obturate it, two scraping cutters can be provided integral with the screw, as for the chopper.

By way of example, for an extruded output of 9 metric tons per hour corresponding to a volume of about 8m$^3$ per hour, the screw may ave a diameter of 600mm, a pitch of 250 to 300mm and be driven at 20 r.p.m., the plate 29 having a thickness of 15mm and cylindrical perforations with a diameter of 10mm and equispaced by 13mm. After evaporation, the pellets obtained will have a diameter approximately 10% less than that of the humid strand with an initial water content of 50 to 55%. The length of the pellets will be about once or twice their diameter.

In the evaporation bed 22, the humid pellets with a water content of 50 to 55% supported by the perforated plate 23, form a fluidized bed traversed by a rising stream of a mixture of gases and hot air 24 at a temperature of 120° to 150° C. These gases are produced by combustion of heavy fuel in a combustion chamber arranged to allow the air of the final mixture to heat up to the temperature of equilibrium. The bed is agitated by the conventional fluidization phenomenon. Moreover, the plate 23 is inclined by several degrees to the horizontal and is vibrated vertically, so that all of the bed of material progressively moves from the inlet 31 to the outlet 32. The exhaust gases are collected in a chimney 33 and delivered to the expansion chamber 7 (FIG. 1).

The extruded strands 30, with a suitable moisture content, have rupture lines or weaknesses formed at the output of the extruder 20 which they leave horizontally and progressively bend under the action of gravity, which favorizes breakage thereof. The broken off ends of the strands fall onto a receiving surface formed by belt 21, whereby the impact causes breakage thereof, and then fall onto the bed 22 which causes further breakages. The hot gases, the movement of the particles relative to one another in the fluidized bed, and the vibrations produce further breakages of the remainders of the strands until their length is comprised mainly within once or twice the diameter. The pelletization is thus obtained by physical constraints without cutting, compression or use of a pelletizing drum or the like.

In the bed 22, there is generally superficial evaporation of the pellets, whereas the central core remains humid, as the gas heats the pellets but the water in the central core remains imprisoned. It is consequently advisable to allow for a rest period in a cylindrical, vertical silo to allow the water in the central cores to diffuse towards the periphery of the pellets. The rest silo is loaded at the top by a bucket lift, and is elevated so as to discharge by gravity. It is cylindrical to avoid pellets from gripping along angular walls and causing so-called "bridge" phenomena.

According to the state of the inner surface of the silo, it may be advisable to place small vibrators along one or more generatrices. The pellets remain in the silo for a sufficient time, about 1 hour, to allow homogenization of the water content.

Oversize pellets and dust removed by sieving are fed back to the storage area 3.

Complete evaporation in the bed 22, to reduce the moisture content from 50 – 55% to 10 – 14%, can take place in a single stage if the hot gases 24 are at low temperatures of the order of 60° C and if the vibrating plate 23 is of sufficient dimensions and only slightly inclined so that the time of contact between the hot gases and the pellets is sufficiently long to permit a progressive, continuous and regular evaporation. However, to treat large quantities of material on a modern industrial scale, these "sufficient" dimensions are such that the vibrating bed becomes very cumbersome and costly; also the power required to vibrate the bed increases with the length thereof.

It is possible to reduce the dimensions and cost of the installation and to increase the efficiency, notably the thermic efficiency, as follows. In the vibrating bed, the pellets undergo a first phase of dehydration which simply brings them to a non-tacky state, are then placed in a rest hopper, and then submitted to further dehydration in a fluidized bed having a fixed perforated plate through which hot gas is supplied.

The only requirement for the material leaving the vibrating bed is that it should not be tacky; this suffices to avoid reagglomeration of the pellets, so that the dimensions of this vibrating bed and the time of passage of the material can be maintained within reasonable and economically acceptable limits.

In this case, gases having passed through the pelletized material in the vibrating bed are relatively cool and humid. Preferably, these gases are not supplied to the expansion chamber as their thermic capacity is low, but are supplied to the pile of raw material on the storage areas so that the dust or fine powder carried by these gases is deposited and thus recuperated. The gases having passed through a subsequent fixed-plate bed are much hotter and drier, and are supplied to the expansion chamber. The speed of these gases delivered to the fixed plate bed is preferably relatively high, of the order of 4m/sec.

Figure 4:
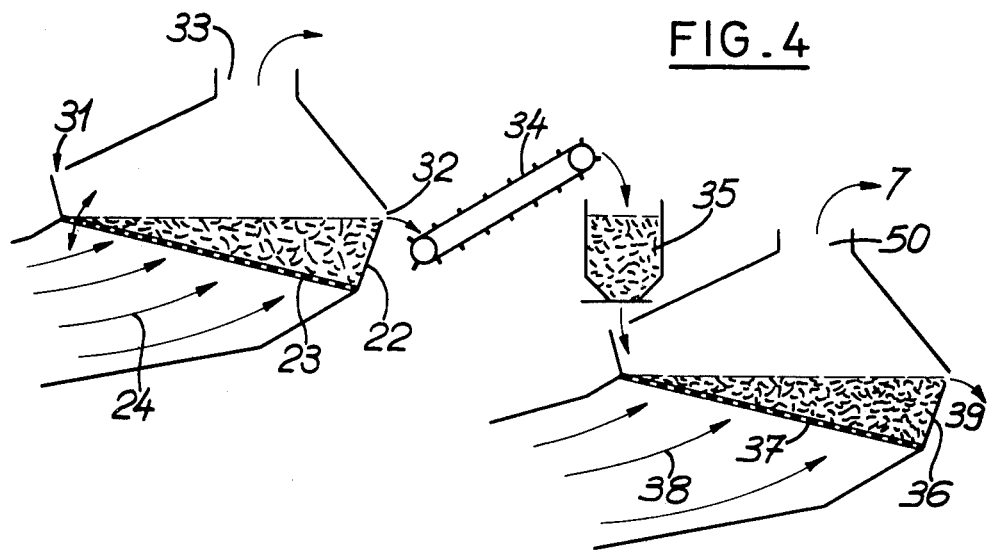
FIG. 4 shows the remaining elements complementary to those of FIG. 3.
Figure 4:
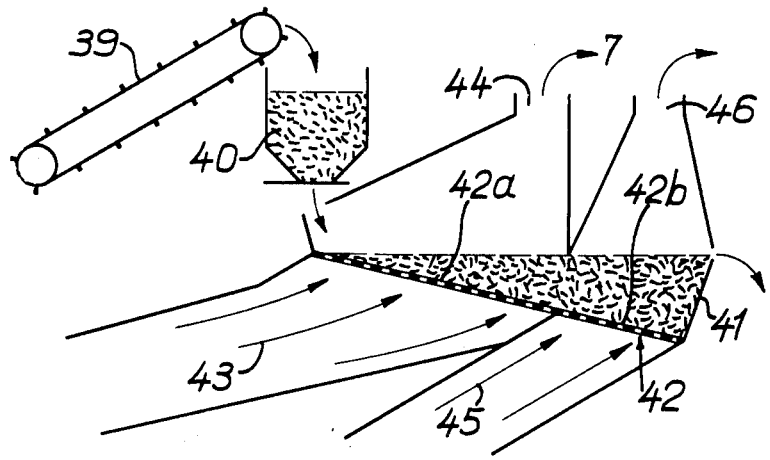
Figure 4:
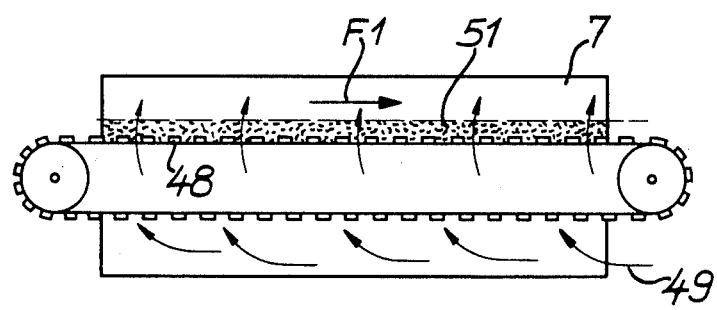

The complementary installation shown in FIG. 4 comprises a conveyor 34 at the output of the vibrating bed 22, a rest hopper 35, a first fixed perforated plate 37 traversed by a rising stream of hot gases 38 at a temperature of about 100° C and a relatively high speed of 4m/sec to form a fluidized bed, a conveyor 39, a second rest hopper 40 and a second fixed perforated plate 42 divided into two sections, a first section 42a extending over the first two thirds of the length of plate 42, and a second section 42b extending over the final third of the inclined plate. Section 42a is traversed by a rising current of hot gases 43 at a temperature of about 100° C and a high inlet speed, of the order of 4m/sec, these gases being recuperated above the bed by a chimney 44, whereas the second section 42b is traversed by a rising current of ambient air 45 recuperated at the outlet by a chimney 46. The expansion chamber 7 is in the form of a tunnel through which passes a perforated or grid-like conveyor 48 conveying a layer of humid material in the direction of arrow F1, the hot dust-laden gases recuperated from the evaporation beds 36 and 41 being introduced at 49 into the lower part of chamber 7 in the counter current direction to arrow F1.

The broken strands leaving the extruder and whose pelletization is completed in the vibrating bed 22 only remain in this bed for a time sufficient to give then a non-tacky state. The pellets are then delivered to the rest hopper 35 by means of the raising conveyor 34 and remain in this hopper the time required for homogenization of the moisture content of the pellets, by self rehumidification from the center towards the periphery. A second contact with the hot gases enables a rapid evaporation of the peripheral and underlying water; evaporation of the water in the central core of the granules already dried at their periphery and in the underlying layers would require a supplementary quantity of heat and involve a heating of the product which may be detrimental to its qualities. The pellets are then discharged into the evaporation bed 36, of conventional type in which dehydration continues under the action of the hot gases 38. The pellets arriving in bed 36 are already partially dehydrated and are hot; moreover the hot gases enter the fixed bed at high speed (about 4m/sec), and do not have an important exchange of heat, so that the gases recuperated at 50 and delivered to the expansion chamber 7 are relatively hot and dry; consequently they have a high heat exchange efficiency in the expansion chamber. The pellets are then brought by lifting conveyor 39 to the second rest hopper 40 where they undergo a further homogenization of the moisture content, and are then discharged onto the second fixed bed 41. In the first section 42a of this bed, dehydration is terminated and the gases recuperated in chimney 44 are relatively hot and dry. In the second section 42b, the pellets are cooled by the current of air at ambient temperature. The air recuperated in chimney 46, at several degrees Centigrade above ambient temperature, is delivered to a pile of humid material on a storage area so as to deposit and recuperate the dust and fine particles. The pellets leaving bed 41 can be used directly or stored in silos.

In the expansion chamber 7, the recuperated hot gases 49 pass through a layer of humid raw material 51 having a thickness of about 250 to 300mm and at a low speed of about 0.4m/sec. The heat exchange by passage through the humid material enables an evaporation of about eight times more water than that produced by a superficial heat exchange, and also enables recuperation of all of the dust carried by the gases. The material leaves the expansion chamber 7 with the desired moisture content of between 50 and 55%. As a variation, the expansion chamber could contain a fixed grid.

What is claimed is:

1. An installation for processing organic waste materials into pellets, comprising areas for storing and mixing organic waste materials, at least one chamber for passing hot dust-carrying exhaust gas through mixed and partly dried organic waste material to recuperate the heat in said gas and the dust carried thereby, at least one oven for heating mixed organic materials, means for breaking and pulverizing the mixed and partly dried organic materials, adjustable supply means for supplying the pulverized organic materials, chopping means receiving organic materials from said supply means for chopping the received organic materials, means for extruding the chopped organic materials to form strands, at least one perforated vibrating plate receiving broken strands from the extruding means, means for supplying a rising current of hot air through perforations of said plate, and at least one rest silo.

2. An installation according to claim 1, in which said chambers includes means for extracting vapors and cool gas.

3. An installation according to claim 1, in which said chopping means are formed by a cylindrical Archimedean-screw chopper having an outlet grid against which an end of the screw adjacent said grid comes into contact at an angle decreasing to zero degrees, at least one cutter driven with the screw and contacting the screw side of the grid, and an external rotary cutting device contacting the plate and driven at a different speed to the screw.

4. An installation according to claim 1, in which said extruding means are formed by a cylindrical Archimedean-screw extruder having an outlet grid in which an end of the screw adjacent said grid contacts the grid at an angle decreasing to zero degrees.

5. An installation according to claim 4, in which said extruding means includes at least one cutter driven with the screw and contacting the screw side of the grid to prevent the accumulation of fibrous particles at the inlet of the grid orifices.

6. An installation according to claim 1, comprising, after said vibrating plate, at least one rest hopper, at least one fixed perforated-plate evaporation bed, and means for supplying a rising current of hot gas through said bed.

7. A system for manufacturing pellets from organic waste materials, comprising:
 moisture control means receptive in use of organic waste materials of different moisture content for mixing the organic waste materials to control the moisture content of the organic waste materials to be within 45% to 60%;
 means for receiving the mixed organic waste materials having a moisture content from 45% to 60% for breaking up agglomerated masses of the mixed organic waste materials;
 extruding means for receiving the broken up mixed waste material and oriented for extruding the same into unsupported strands which break off under their own weight; and
 heating means for receiving and for heating the broken strands of extruded organic waste material with hot gases having a temperature range from about 120° to 150° C. to reduce the moisture content of the broken strands of extruded organic waste material and thereby form pellets therefrom.

8. A system according to claim 7, wherein said heating means comprises: a perforated plate-like member having an upper major surface for receiving thereon the broken strands of extruded waste material and an opposed lower major surface, said perforated plate-like member having perforations therethrough and opening at the two major surfaces of said plate-like member; vibrating means for vibrating said plate-like member while broken strands of extruded waste material are on said upper major surface, and for vibrating said plate-like member with sufficient energy to break the strands of extruded waste material into pellets having lengths on the order of one to two times their respective diameters; and gas supply means for supplying hot gases at a temperature from about 120° to 150° C. to said lower major surface of said plate-like member for flowing said hot gases through the perforations in said plate-like member to heat the broken strands of extruded waste material on said upper major surface and thereby reduce the moisture content of the strands of waste material.

9. A system according to claim 8, wherein said gas supply means supplies hot gases at a rate sufficient to form above said upper major surface a fluidized bed of pellets of organic waste material in a stream of the hot gas supplied by said gas supply means.

10. A system according to claim 7, wherein said moisture control means comprises: storage means for storing organic waste materials of different moisture content; mixing means for mixing organic waste materials of different moisture content; an oven for heating mixed organic waste materials to reduce the moisture content thereof; a drying chamber for housing in use moist organic waste materials for receiving hot gases to reduce the moisture content of the organic waste materials housed therein; and means operable for defining material transfer circuits between selected ones of said storage means, said mixing means, said oven, and said drying chamber to transfer organic waste materials of different moisture content therebetween to control the moisture content of the mixed organic waste materials to be within 45% to 60%.

* * * * *